United States Patent
Bayesteh et al.

(10) Patent No.: US 12,284,039 B2
(45) Date of Patent: *Apr. 22, 2025

(54) LOW LATENCY ACK/NACK TRANSMISSION

(71) Applicants: Alireza Bayesteh, Brossard (CA); Navid Tadayon, Kanata (CA); Jianglei Ma, Ottawa (CA)

(72) Inventors: Alireza Bayesteh, Brossard (CA); Navid Tadayon, Kanata (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,599

(22) Filed: Aug. 12, 2022

(65) Prior Publication Data

US 2022/0393797 A1  Dec. 8, 2022

Related U.S. Application Data

(63) Continuation of application No. 16/988,848, filed on Aug. 10, 2020, now Pat. No. 11,418,289.

(51) Int. Cl.
*H04L 1/1607* (2023.01)
*H04L 1/00* (2006.01)
(Continued)

(52) U.S. Cl.
CPC ......... *H04L 1/1692* (2013.01); *H04L 1/0036* (2013.01); *H04L 5/1469* (2013.01); *H04W 52/0229* (2013.01)

(58) Field of Classification Search
CPC ... H04L 1/1692; H04L 5/1469; H04L 1/0036; H04L 25/03898; H04L 25/03904;
(Continued)

(56) References Cited

U.S. PATENT DOCUMENTS 6,084,530 A     7/2000  Pidwerbetsky et al.
2011/0051824 A1* 3/2011  Kim ................ H04L 1/1861
                                                   375/259
(Continued)

FOREIGN PATENT DOCUMENTS

CN   105005751 A   10/2015
CN   110289938 A    9/2019
CN   110830097 A    2/2020

OTHER PUBLICATIONS

3GPP TSG RAN WG1 Meeting #101; R1-2003602; Source: CATT, Title: Discussion on HARQ-ACK feedback for SPS PDSCH release with cross-carrier scheduling, May 25-Jun. 5, 2020. (Year: 2020).*
(Continued)

*Primary Examiner* — Mohammed S Chowdhury

(57) ABSTRACT

Some embodiments of the present disclosure provide a user equipment (UE) having active device components and passive device components. Responsive to receiving downlink (DL) transmissions in time division duplexing (TDD) mode, the active device components perform DL decoding while the passive device components perform passive transmission of ACK/NACK data. Such passive transmission may involve encoding the ACK/NACK data in an altered version of received radio frequency (RF) signals and using so-called backscatter communications to reflect the received RF signals, with alteration, using the same frequency resources used to receive the DL transmissions.

17 Claims, 6 Drawing Sheets

(51) Int. Cl.
  *H04L 5/14*     (2006.01)
  *H04W 52/02*    (2009.01)
(58) Field of Classification Search
  CPC ......... H04L 25/03917; H04L 25/03942; H04L
         25/03949; H04L 25/03936; H04W
         52/0229
  See application file for complete search history.

(56) References Cited

U.S. PATENT DOCUMENTS

| | | | | |
|---|---|---|---|---|
| 2012/0269137 | A1* | 10/2012 | Kang | H04L 5/0055 |
| | | | | 370/329 |
| 2014/0086078 | A1* | 3/2014 | Malladi | H04W 72/042 |
| | | | | 370/252 |
| 2015/0098432 | A1* | 4/2015 | Han | H04B 7/0426 |
| | | | | 370/329 |
| 2020/0036469 | A1* | 1/2020 | Wen | H04L 1/1867 |
| 2020/0187165 | A1 | 6/2020 | Park et al. | |
| 2021/0226737 | A1* | 7/2021 | Huang | H04L 1/1864 |

OTHER PUBLICATIONS

Chang-Hee Kang et al., "Signal Detection Scheme in Ambient Backscatter System With Multiple Antennas", IEEE Jul. 28, 2017, total 5 pages.

Fraunhofer View on Release 17 et al.,"We advocate 5G enhancements to make Rel-17 become a basis for new markets: 5G for Verticals Industry 4.0, automotive, PPDR, satellites, drones, . . . ", 3GPP RAN#84 Rel-17 WS Jun. 4, 2019, Newport Beach (CA), USA, total 26 pages.

3GPP TSG RAN WG1 Meeting #101; R1-2003602; Source: CATT, Title: Description on HARQ-ACK feedback for SPS PDSCH release with cross-carrier scheduling, May 25-Jun. 5, 2020. (Year: 2020).

* cited by examiner

LOW LATENCY ACK/NACK TRANSMISSION

CROSS REFERENCE TO RELATED APPLICATIONS

The present application is a continuation application of U.S. patent application Ser. No. 16/988,848, filed on Aug. 10, 2020, the contents of which are hereby incorporated herein by reference.

TECHNICAL FIELD

The present disclosure relates generally to acknowledgement transmission and, in particular embodiments, to reducing latency in such transmission.

BACKGROUND

Typical wireless communication devices are half duplex communication devices. Half duplex communication refers to an ability to either only receive or only transmit using a given resource (such as a time slot or a particular frequency). That is, the device is not able to both receive and transmit using the given resource. Examples of half duplex communication schemes include time division duplexing (TDD) and frequency division duplexing (FDD). In TDD, once a communication device receives and decodes a downlink (DL) transmission, the communication device then has to switch its transceiver from a DL mode to an up link (UL) mode in order to transmit an acknowledgement (ACK) or negative acknowledgement (NACK) signal in response to the DL transmission. Switching from DL to UL (or vice versa) typically incurs a length of time that may be referred to as latency. Communication protocols often account for the latency ahead of time by planning a length of time known as a guard interval (GI).

For some types of communications, it is desirable to reduce the latency of the ACK/NACK as much as possible. Half duplex communication, and TDD in particular, presents challenges to reducing ACK/NACK latency. If, for example, the DL transmission consists of bursts of transport blocks (TBs), then the latency corresponding to the GIs, in addition to the UL resources required for ACK/NACK transmission, will add up, creating a significant bottleneck for low-latency transmission.

Conventional solutions for reducing ACK/NACK latency may be shown to create other problems. FDD communication dedicates additional frequency resources for ACK/NACK transmissions. This dedication reduces the spectrum efficiency of the overall communications system. Full-duplex communication requires complex hardware and increased power consumption. While this may be feasible for network equipment, a full duplex transceiver is impractical for mobile device implementation.

SUMMARY

Aspects of the present application provide a user equipment (UE) having active device components and passive device components. Responsive to receiving downlink (DL) transmissions (e.g., bursty DL transmissions) in time division duplexing (TDD) mode, the active device components perform DL decoding while the passive device components perform passive transmission of ACK/NACK data. Such passive transmission may involve encoding the ACK/NACK data in an altered version of received radio frequency (RF) signals corresponding to the DL transmissions and using so-called backscatter communications to reflect the received RF signals, with alteration, using the same frequency resources used to receive the DL transmissions.

Since the ACK/NACK data is encoded in an altered version of an RF signal, a reflection of the RF signal, with the encoded ACK/NACK data, can be received at a transmission point while the RF signal is being transmitted by the transmission point. Accordingly, any need for a guard interval is obviated and, accordingly, latency is reduced. Furthermore, additional resources specifically assigned to transmission of ACK/NACK data are not required because the same frequency resources are used to reflect, with alteration, the received RF signals and to receive the DL transmissions.

According to an aspect of the present disclosure, there is provided a method for an apparatus to reduce ACK/NACK transmission latency. The method includes receiving, by the apparatus, a first (RF) signal comprising a first transport block, attempting, by the apparatus, to demodulate and decode the first transport block from the first RF signal, receiving, by the apparatus, a second RF signal after the first RF signal and reflecting, by the apparatus, the second RF signal while altering the second RF signal, the altered and reflected second RF signal comprising a first feedback indicative of whether the first transport block was correctly or incorrectly demodulated and decoded by the apparatus. Additionally, aspects of the present application provide an apparatus for carrying out this method.

According to another aspect of the present disclosure, there is provided a method, at an apparatus, of receiving acknowledgement (ACK) or negative acknowledgement (NACK) transmissions. The method includes transmitting, by the apparatus, a first radio frequency (RF) signal comprising a first transport block, transmitting, by the apparatus, a second RF signal after the first RF signal and receiving, by the apparatus, an altered and reflected version of the second RF signal including a first feedback indicative of whether the first transport block was correctly or incorrectly demodulated and decoded. Additionally, aspects of the present application provide an apparatus for carrying out this method.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
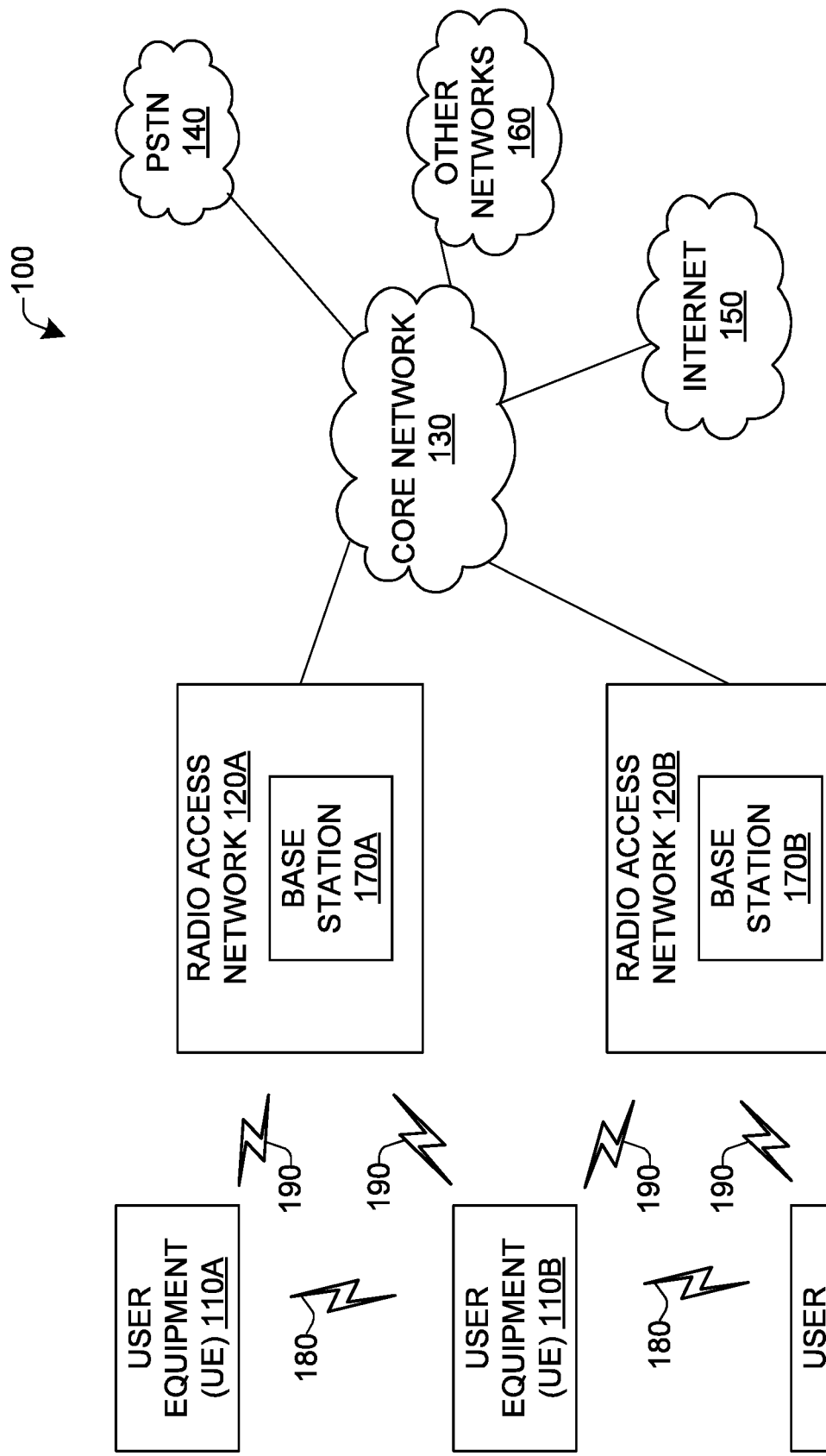
FIG. 1 is a schematic diagram of a communication system in which embodiments of the disclosure may occur, the communication system includes an example user equipment and an example base station.
Figure 2:
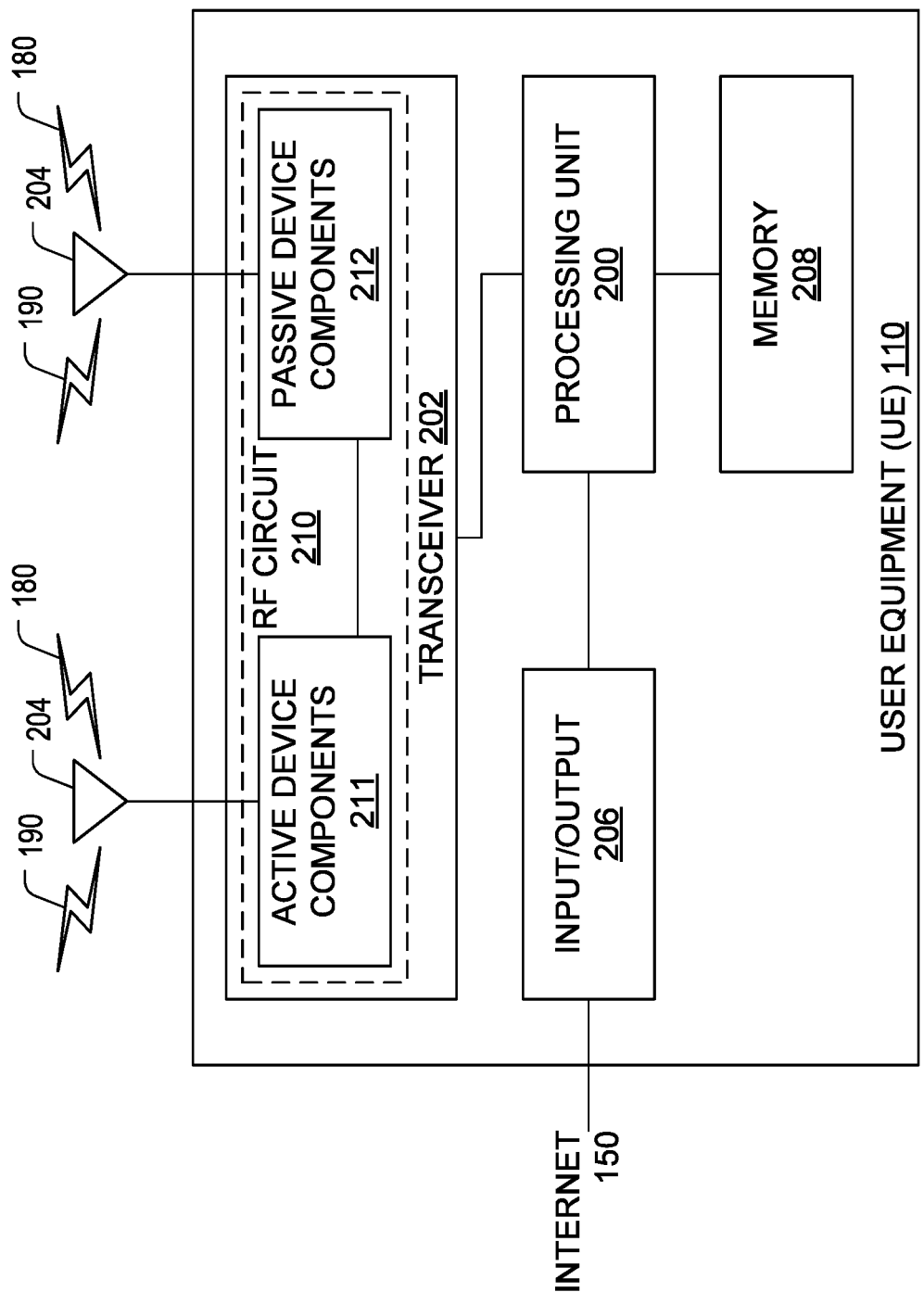
FIG. 2 illustrates, as a block diagram, the example user equipment of FIG. 1, according to aspects of the present disclosure.
Figure 3:
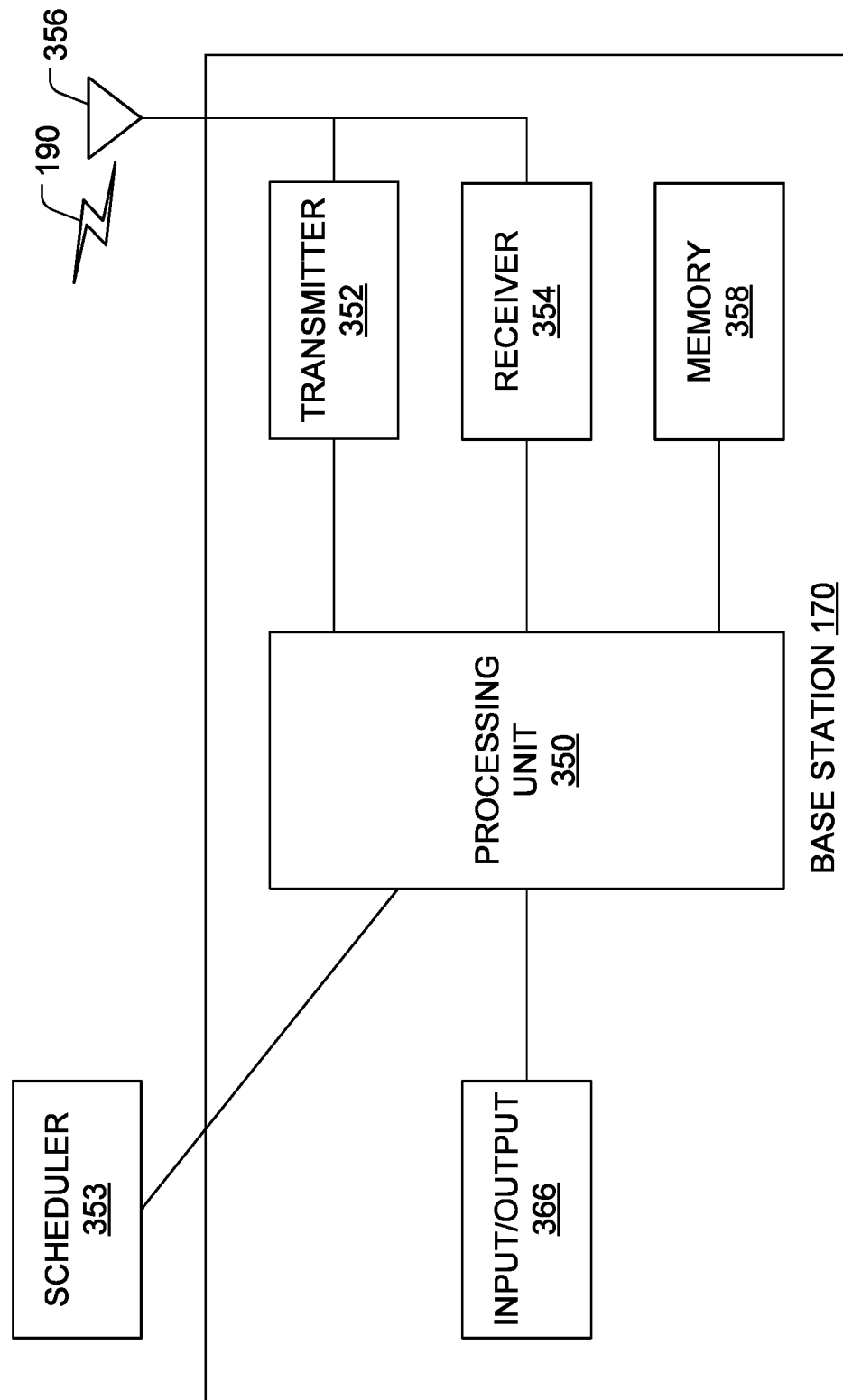
FIG. 3 illustrates, as a block diagram, the example base station of FIG. 1, according to aspects of the present disclosure.

FIGS. 1, 2 and 3 illustrate examples of networks and devices that could implement any or all aspects of the present disclosure.

FIG. 1 illustrates an example communication system 100. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources, such as bandwidth.

In this example, the communication system 100 includes a first electronic device (ED) 110A, a second ED 110b and a third ED 110C (individually or collectively 110), a first radio access network (RAN) 120A and a second RAN 120B (individually or collectively 120), a core network 130, a public switched telephone network (PSTN) 140, the Internet 150 and other networks 160. Although certain numbers of these components or elements are shown in FIG. 1, any reasonable number of these components or elements may be included in the communication system 100.

The EDs 110 are configured to operate, communicate, or both, in the communication system 100. For example, the EDs 110 are configured to transmit, receive, or both via wireless communication channels. Each ED 110 represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), Internet of Things (IoT) device, personal digital assistant (PDA), smartphone, laptop, computer, touchpad, wireless sensor, or consumer electronics device.

In FIG. 1, the first RAN 120A includes a first base station 170A and the second RAN includes a second base station 170B (individually or collectively 170). Each base station 170 is configured to wirelessly interface with one or more of the EDs 110 to enable access to any other base station 170, the core network 130, the PSTN 140, the internet 150 and/or the other networks 160. For example, the base stations 170 may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP) or a wireless router. Any ED 110 may be alternatively or additionally be configured to interface, access or communicate with any other base station 170, the internet 150, the core network 130, the PSTN 140, the other networks 160 or any combination of the preceding. The communication system 100 may include RANs, such as the RAN 120B, wherein the corresponding base station 170B accesses the core network 130 via the internet 150, as shown.

The EDs 110 and the base stations 170 are examples of communication equipment that can be configured to implement some or all of the functionality and/or embodiments described herein. In the embodiment shown in FIG. 1, the first base station 170A forms part of the first RAN 120A, which may include other base stations (not shown), base station controller(s) (BSC, not shown), radio network controller(s) (RNC, not shown), relay nodes (not shown), elements (not shown) and/or devices (not shown). Any base station 170 may be a single element, as shown, or multiple elements, distributed in the corresponding RAN 120, or otherwise. Also, the second base station 170B forms part of the second RAN 120B, which may include other base stations, elements and/or devices. Each base station 170 transmits and/or receives wireless signals within a particular geographic region or area, sometimes referred to as a "cell" or "coverage area." A cell may be further divided into cell sectors and a base station 170 may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RANs 120 shown is exemplary only. Any number of RANs may be contemplated when devising the communication system 100.

The base stations 170 communicate with one or more of the EDs 110 over one or more air interfaces 190 using wireless communication links, e.g., radio frequency (RF) wireless communication links, microwave wireless communication links, infrared (IR) wireless communication links, visible light (VL) communications links, etc. The air interfaces 190 may utilize any suitable radio access technology. For example, the communication system 100 may implement one or more orthogonal or non-orthogonal channel access methods, such as code division multiple access (CDMA), time division multiple access (TDMA), space division multiple access (SDMA), frequency division multiple access (FDMA), orthogonal FDMA (OFDMA) or single-carrier FDMA (SC-FDMA) in the air interfaces 190.

A base station 170 may implement Universal Mobile Telecommunication System (UMTS) Terrestrial Radio Access (UTRA) to establish the air interface 190 using wideband CDMA (WCDMA). In doing so, the base station 170 may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170 may establish the air interface 190 with Evolved UTMS Terrestrial Radio Access (E-UTRA) using LTE, LTE-A, LTE-B and/or 5G New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE and GERAN. Of course, other multiple access schemes and wireless protocols may be utilized.

The RANs 120 are in communication with the core network 130 to provide the EDs 110 with various services such as voice communication services, data communication services and other communication services. The RANs 120 and/or the core network 130 may be in direct or indirect communication with one or more other RANs (not shown), which may or may not be directly served by the core network 130 and may or may not employ the same radio access technology as the first RAN 120A, the second RAN 120B or both. The core network 130 may also serve as a gateway access between (i) the RANs 120 or EDs 110 or both, and (ii) other networks (such as the PSTN 140, the Internet 150 and the other networks 160).

The EDs 110 may communicate with one another over one or more sidelink (SL) air interfaces 180 using wireless communication links, e.g., radio frequency (RF) wireless communication links, microwave wireless communication links, infrared (IR) wireless communication links, visible light (VL) communications links, etc. The SL air interfaces 180 may utilize any suitable radio access technology and may be substantially similar to the air interfaces 190 over which the EDs 110 communication with one or more of the base stations 170 or they may be substantially different. For example, the communication system 100 may implement one or more channel access methods, such as CDMA, TDMA, FDMA, SDMA, OFDMA or SC-FDMA in the SL air interfaces 180. In some embodiments, the SL air interfaces 180 may be, at least in part, implemented over unlicensed spectrum.

Some or all of the EDs 110 may include functionality for communicating with different wireless networks over different wireless links using different wireless technologies and/or protocols. Instead of wireless communication (or in addition thereto), the EDs 110 may communicate via wired communication channels to a service provider or a switch (not shown) and to the Internet 150. The PSTN 140 may include circuit switched telephone networks for providing plain old telephone service (POTS). The Internet 150 may include a network of computers and subnets (intranets) or both and incorporate protocols, such as internet protocol (IP), transmission control protocol (TCP) and user datagram protocol (UDP). The EDs 110 may be multimode devices capable of operation according to multiple radio access technologies and incorporate multiple transceivers necessary to support multiple radio access technologies.

FIG. 2 illustrates example components that may implement the methods and teachings according to the present disclosure. In particular, FIG. 2 illustrates an example UE 110. These components could be used in the communication system 100 or in any other suitable system.

As shown in FIG. 2, the UE 110 includes at least one processor or processing unit 200. The processing unit 200 implements various processing operations of the UE 110. For example, the processing unit 200 could perform signal coding, bit scrambling, data processing, power control, input/output processing, or any other functionality, thereby enabling the UE 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, a microcontroller, a digital signal processor, a field programmable gate array or an application specific integrated circuit.

The UE 110 also includes at least one transceiver 202. The transceiver 202 includes an RF circuit 210 that is configured to modulate data or other content for transmission by at least one antenna 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna among the at least one antenna 204 includes any suitable structure for transmitting and/or receiving wireless or wired signals. One or multiple transceivers 202 could be used in the UE 110. One or multiple antennas 204 could be used in the UE 110. Although shown as a single functional unit, a transceiver 202 could also be implemented using at least one transmitter and at least one separate receiver.

The RF circuit 210 is illustrated as including a set of active device components 211 connected to one of the antennas 204. In addition, the RF circuit 210 is illustrated as including a set of passive device components 212 connected to an associated one of the antennas 204.

The term "passive," as used herein in the phrase "passive device components," bears clarification. In a typical discussion of electronic components, the term "passive" is given to those electronic components that lack an ability to control electric current by means of another electrical signal. Examples of passive electronic components are capacitors, resistors, inductors, transformers and some diodes. In contrast, the term "active" is given to those electronic components that can control the flow of electricity by means of another electrical signal. Some examples of active electronic components are transistors, vacuum tubes and silicon-controlled rectifiers.

In a discussion of electronic components in the present application, the term "passive" is given to those electronic components that lack a requirement for conversion to baseband when receiving or transmitting signals. In contrast, the term "active" is given to those electronic components that employ conversion to baseband when receiving or transmitting. In other words, the "passive" circuits of the present application may, in some examples, consist of only those electronic components that lack an ability to control electric current by means of another electrical signal, and in some other examples, may further comprise those electronic components that can control the flow of electricity by means of another electrical signal. Conveniently, passive device components 212 are configured to perform their functions in the RF domain in contrast to the active device components 211, which are configured to perform their functions in the baseband domain. As a consequence, the power consumption level of the passive device components 212 is very low relative to the power consumption level of the active device components 211.

In accordance with aspects of the present application, the processing unit 200 of the electronic device 110 may cause the passive device components 212 to perform certain functions known to be performed by the active device components 211, thereby reducing overall power consumption. Indeed, the amount by which the overall power consumption is expected to be reduced is roughly the power consumption associated with the active device components 211 performing the certain functions.

The UE 110 further includes one or more input/output devices 206 or interfaces (such as a wired interface to the Internet 150). The input/output devices 206 permit interaction with a user or other devices in the network. Each input/output device 206 includes any suitable structure for providing information to, or receiving information from, a user, such as a speaker, a microphone, a keypad, a keyboard, a display or a touch screen, including network interface communications.

In addition, the UE 110 includes at least one memory 208. The memory 208 stores instructions and data used, generated or collected by the UE 110. For example, the memory 208 could store software instructions or modules configured to implement some or all of the functionality and/or embodiments described herein and that are executed by the processing unit 200. Each memory 208 includes any suitable volatile and/or non-volatile storage and retrieval device. Any suitable type of memory may be used, such as a random access memory (RAM), a read only memory (ROM), a hard disk, an optical disc, a subscriber identity module (SIM) card, a memory stick, a secure digital (SD) memory card and the like.

As illustrated in FIG. 3, the base station 170 includes at least one processing unit 350, at least one transmitter 352, at least one receiver 354, one or more antennas 356, at least one memory 358 and one or more input/output devices or interfaces 366. A transceiver (not shown) may be used instead of the transmitter 352 and receiver 354. A scheduler 353 may be coupled to the processing unit 350. The scheduler 353 may be included within, or operated separately from, the base station 170. The processing unit 350 implements various processing operations of the base station 170, such as signal coding, bit scrambling, data processing, power control, input/output processing or any other functionality. The processing unit 350 can also be configured to implement some or all of the functionality and/or embodiments described in more detail above. Each processing unit 350 includes any suitable processing or computing device configured to perform one or more operations. Each processing unit 350 could, for example, include a microprocessor, a microcontroller, a digital signal processor, a field programmable gate array or an application specific integrated circuit.

Each transmitter 352 includes any suitable structure for generating signals for wireless or wired transmission to one or more EDs 110 or other devices. Each receiver 354 includes any suitable structure for processing signals received wirelessly or by wire from one or more EDs 110 or other devices. Although shown as separate components, at least one transmitter 352 and at least one receiver 354 could be combined into a transceiver. Each antenna 356 includes any suitable structure for transmitting and/or receiving wireless or wired signals. Although a common antenna 356 is shown here as being coupled to both the transmitter 352 and the receiver 354, one or more antennas 356 could be coupled to the transmitter 352 and one or more separate antennas 356 could be coupled to the receiver 354. Each memory 358 includes any suitable volatile and/or non-volatile storage and retrieval device(s) such as those described above in connection to the UE 110. The memory 358 stores instructions and data used, generated or collected by the base station 170. For example, the memory 358 could store software instructions or modules configured to implement some or all of the functionality and/or embodiments described above and that are executed by the processing unit 350.

Each input/output device 366 permits interaction with a user or other devices in the network. Each input/output device 366 includes any suitable structure for providing information to or receiving/providing information from a user, including network interface communications.

Additional details regarding the UE 110 and the base stations 170 are known to those of skill in the art. As such, these details are omitted here for clarity.

It may be considered desirable to reduce the latency of ACK/NACK data transmissions responsive to DL transmissions, especially bursty DL transmissions.

According to aspects of the present application, responsive to receiving, at the UE 110, DL transmissions such as bursty DL transmissions, the active device components 211 perform DL decoding while the passive device components 210 performs passive reflection in a manner that allows transmission of ACK/NACK data. Such passive reflection may involve encoding the ACK/NACK data in an altered version of received RF signals corresponding to the DL transmissions and using so-called backscatter communications to reflect the altered version of the received RF signal.

Using the proposed solution, ACK/NACK data latency is reduced due to an absence of GIs. Indeed, no GI is necessary, since the UE 110 need not transit to a UL transmission mode. Since the passive reflection, by the nature of reflection, uses the same frequency resources used to receive the DL transmissions, specific UL ACK/NACK frequency resources are unnecessary.

It is expected herein that there exists full-duplex (FD) capability at the base station 170. Notably, at the base station 170, the ACK/NACK data can be decoded from the altered version of the RF signals corresponding to the DL transmissions, since the base station 170 knows the contents of the DL transmissions.

One use case for aspects of the present application may be found in smart factories, where there is typically a short distance between TP and UE to enable backscatter communications and low latency transmission is beneficial.

Figure 4:
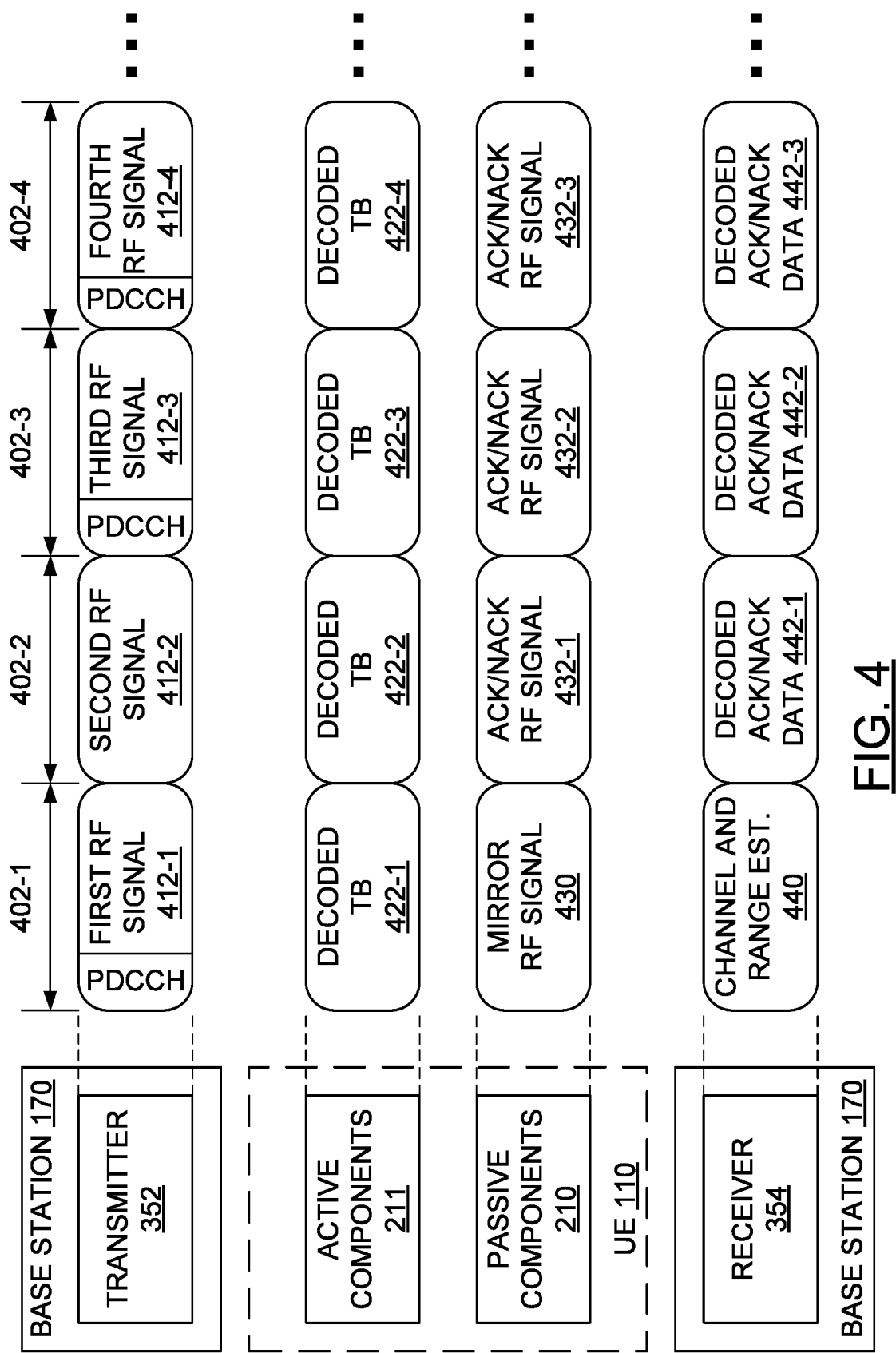
FIG. 4 illustrates a summary of user equipment and base station operations in a context of structure and timing of transport blocks, according to aspects of the present disclosure.
Figure 5:
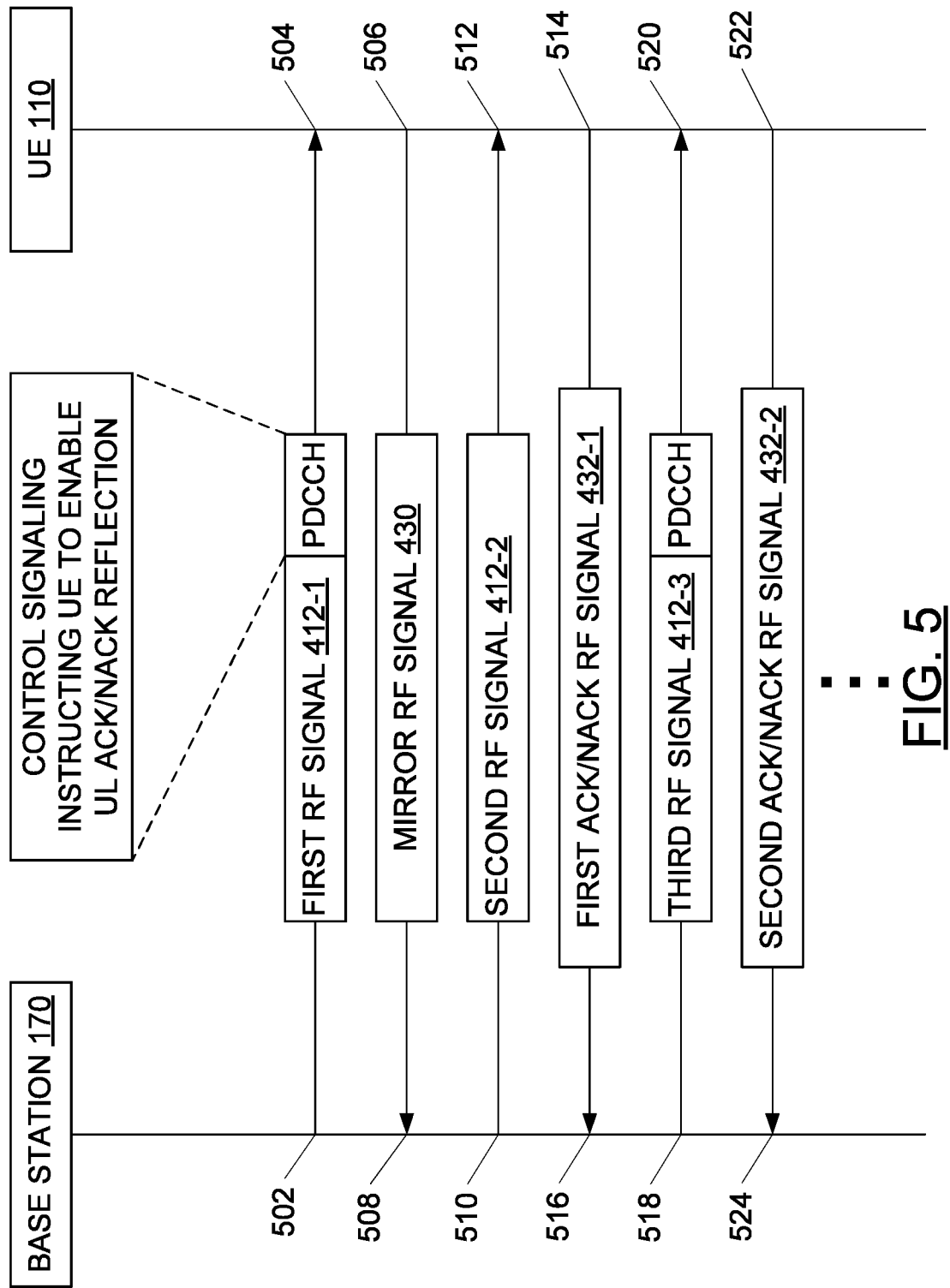
FIG. 5 illustrates a flow diagram of communication between the base station and the user equipment, according to aspects of the present disclosure.
Figure 6:
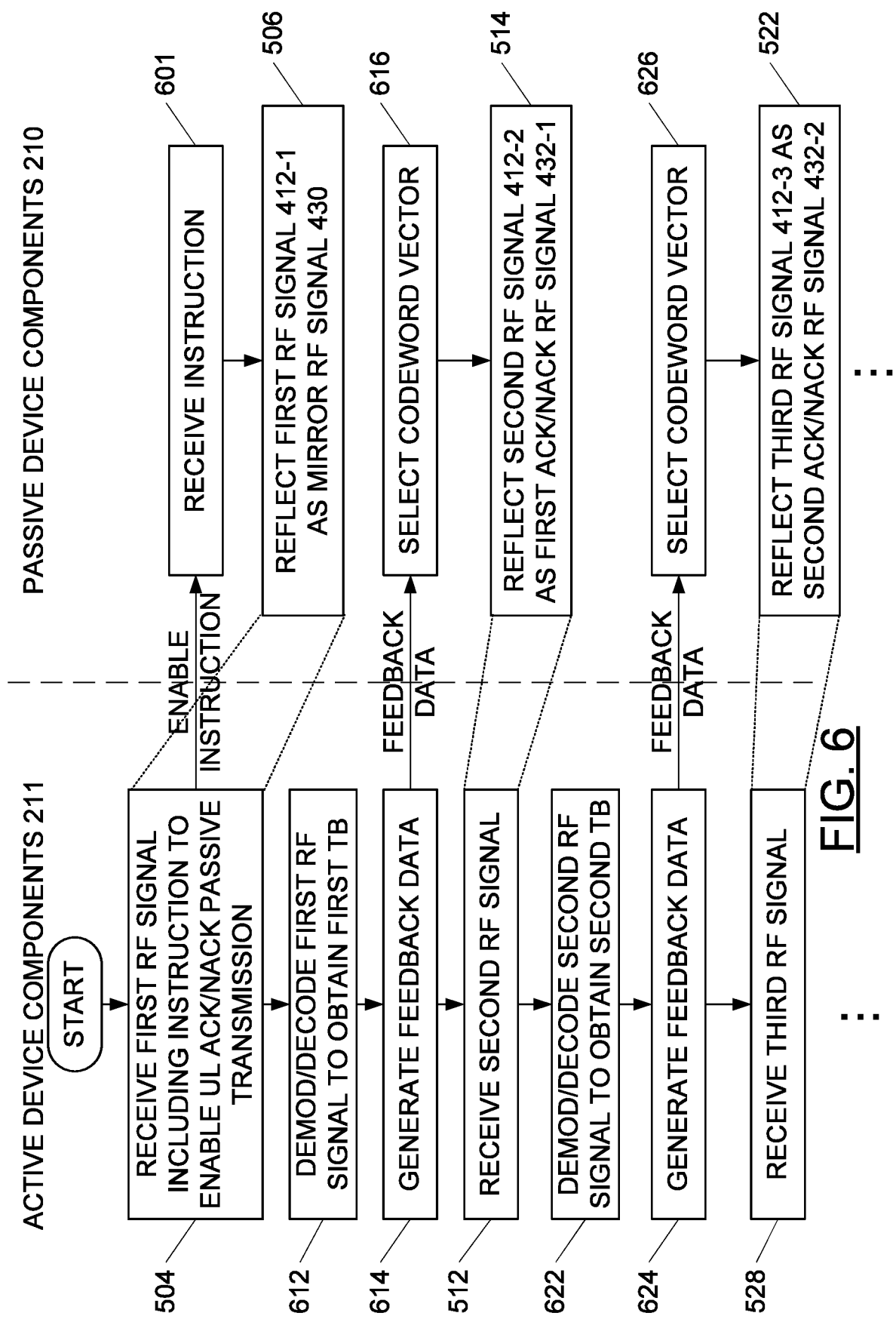
FIG. 6 illustrates example steps in a method of operating the user equipment in the context of reflecting RF signals encoded with ACK/NACK data, according to aspects of the present disclosure.

FIG. 4 illustrates a summary of UE and BS operations in a context of structure and timing of transport blocks. FIG. 5 illustrates a flow diagram of communication between the BS 170 and the UE 110. FIG. 6 illustrates example steps in a method of operating the UE 110 in the context of UL ACK/NACK passive reflection.

In a first time slot 402-1, the transmitter 352 of the BS 170 transmits (step 502) a first RF signal 412-1 of a DL transmission.

The TB carried by the first RF signal 412-1 includes a plurality of symbols (not specifically shown). The first symbol or symbols of the first TB may implement a physical downlink control channel (PDCCH) signaling that allows the BS 170 to instruct the UE 110 to enable UL ACK/NACK reflection. There are, of course, other types of control signaling by which the BS 170 can instruct the UE 110 to enable UL ACK/NACK reflection. The other types of control signaling include Radio Resource Control (RRC) signaling and signaling that uses Media Access Control (MAC) Control Elements (CEs).

Responsive to receiving (step 504) the first RF signal 412-1 implementing the PDCCH signaling, the active device components 211 enable the passive device components 210. Responsive to receiving (step 601) an enable instruction, the passive device components 210 perform a "mirror reflection" operation. In a "mirror reflection" operation, the passive device components 210 use backscatter communications to reflect (step 506) a mirror RF signal 430 that is an unaltered version of the first RF signal 412-1. In a manner that beneficially conserves resources, it is the nature of the passive device components 210 reflecting (step 506) the unaltered version of the first RF signal as the mirror RF signal 430 that the same frequency resources are used by the active device components 211 to receive (step 504) the first RF signal 412-1.

The active device components 211 of the UE 110, upon receiving (step 504) the first RF signal 412-1 in the first time slot 402-1, demodulate and decode (step 612) the first RF signal 412-1 to yield a first decoded TB 422-1. The active device components 211 generate (step 614) ACK/NACK feedback data based on the first decoded TB 422-1. The active device components 211 also provide, to the passive device components 210, the ACK/NACK feedback data, which is understood to be related to the first decoded TB 422-1.

Responsive to receiving the ACK/NACK feedback data, the passive device components 210 of the UE 110 select (step 616), on the basis of the ACK/NACK feedback data specific to the first decoded TB 422-1 received from the active device components 211, an ACK/NACK codeword vector from a pre-configured ACK/NACK codebook. Each ACK/NACK codeword vector in the pre-configured ACK/NACK codebook includes a plurality of complex symbols.

The pre-configured ACK/NACK codebook may be stored in the memory 208 of the UE 110 after having been received from the BS 170 (or other device in the network 100) at some earlier point in time. In aspects of the present application, the pre-configured ACK/NACK codebook may be provided by the BS 170 to the UE 110 using RRC signaling or signaling that uses MAC-CEs. Alternatively, the pre-configured ACK/NACK codebook may be provided by the BS 170 to the UE 110 using PDCCH signaling.

Still in the first time slot 402-1, upon receiving (step 508) the mirror RF signal 430, the receiver 354 of the BS 170 may perform analysis on the received reflected signal, thereby resulting in a channel and range estimate 440.

In a second time slot 402-2, the transmitter 352 of the BS 170 transmits (step 510) a second RF signal 412-2 and the passive device components 210 of the UE 110 reflect (step 514) the second RF signal 412-2 as the first ACK/NACK RF signal 432-1. While reflecting (step 514) the second RF signal 412-2, the passive device components 210 alter the second RF signal 412-2, employing the selected ACK/NACK codeword vector, to arrive at the first ACK/NACK RF signal 432-1. In a manner that beneficially conserves resources, the passive device components 210 reflect (step 514) the second RF signal 412-2 using the same frequency resources as are used by the active device components 211 to receive (step 512) the second RF signal 412-2.

The active device components 211 of the UE 110, upon receiving (step 512) the second RF signal 412-2 in the second time slot 402-2, demodulate and decode (step 622) the second RF signal 412-2 to yield a second decoded TB 422-2. The active device components 211 generate (step 624) ACK/NACK feedback data based on the second decoded TB 422-2. The active device components 211 also provide, to the passive device components 210, the ACK/NACK feedback data, which is understood to be related to the second decoded TB 422-2.

Responsive to receiving the ACK/NACK feedback data, the passive device components 210 of the UE 110 select (step 626), on the basis of the ACK/NACK feedback data specific to the second decoded TB 422-2 received from the active device components 211, an ACK/NACK codeword vector from the pre-configured ACK/NACK codebook.

Still in the second time slot 402-2, the receiver 354 of the BS 170 receives the first ACK/NACK RF signal 432-1 and decodes the first ACK/NACK RF signal 432-1. The result of decoding the first ACK/NACK RF signal 432-1 is first decoded ACK/NACK data 442-1, which is feedback indicative of whether the first decoded TB 422-1 was correctly or incorrectly decoded.

In a third time slot 402-3, the transmitter 352 of the BS 170 transmits (step 518) a third RF signal 412-3 and the passive device components 210 of the UE 110 reflect (step 522) the third RF signal as the second ACK/NACK RF signal 432-2. While reflecting (step 522) the third RF signal 412-3, the passive device components 210 alter the third RF signal 412-3, employing the selected ACK/NACK codeword vector, to arrive at the second ACK/NACK RF signal 432-2. In a manner that beneficially conserves resources, the passive device components 210 reflect (step 522) the third RF signal 412-3 using the same frequency resources as are used by the active device components 211 to receive (step 520) the third RF signal 412-3.

The active device components 211 of the UE 110, upon receiving (step 520) the third RF signal 412-3 in the third time slot 402-3, demodulate and decode the third RF signal 412-3 to yield a third decoded TB 422-3. The active device components 211 generate ACK/NACK feedback data based on the third decoded TB 422-3. The active device components 211 also provide, to the passive device components 210, the ACK/NACK feedback data specific to the third decoded TB 422-3.

The BS 170 may transmit, as part of the third RF signal 412-3, some PDCCH signaling that reports a decoding status for the first ACK/NACK signal 432-1. There are, of course, other types of control signaling by which the BS 170 can report a decoding status to the UE 110.

Responsive to receiving the ACK/NACK feedback data, the passive device components 210 of the UE 110 select, on the basis of the ACK/NACK feedback data specific to the third decoded TB 422-3 received from the active device components 211, an ACK/NACK codeword vector from the pre-configured ACK/NACK codebook.

Still in the third time slot 402-3, the receiver 354 of the BS 170 receives the second ACK/NACK RF signal 432-2 and decodes the second ACK/NACK RF signal 432-2. The result of decoding the second ACK/NACK RF signal 432-2 is second decoded ACK/NACK data 442-2, which is feedback indicative of whether the second decoded TB 422-2 was correctly or incorrectly decoded.

In a fourth time slot 402-4, the transmitter 352 of the BS 170 transmits a fourth RF signal 412-4 and the passive device components 210 of the UE 110 reflect the fourth RF signal 412-4 as the third ACK/NACK RF signal 432-3. While reflecting the fourth RF signal 412-4, the passive device components 210 alter the fourth RF signal 412-4, employing the selected ACK/NACK codeword vector, to arrive at the third ACK/NACK RF signal 432-3. In a manner that beneficially conserves resources, the passive device components 210 reflect the fourth RF signal 412-4 using the same frequency resources as are used by the active device components 211 to receive the fourth RF signal 412-4.

The active device components 211 of the UE 110, upon receiving the fourth RF signal 412-4 in the fourth time slot 402-4, demodulate and decode the fourth RF signal 412-4 to yield a fourth decoded TB 422-4. The active device components 211 generate ACK/NACK feedback data based on the fourth decoded TB 422-4. The active device components 211 also provide, to the passive device components 210, the ACK/NACK feedback data specific to the fourth decoded TB 422-4.

The BS 170 may transmit, as part of the fourth RF signal 412-4, some PDCCH signaling that reports a decoding status for the second ACK/NACK TB 432-2. There are, of course, other types of control signaling by which the BS 170 can report a decoding status to the UE 110.

Responsive to receiving the ACK/NACK feedback data, the passive device components 210 of the UE 110 select, on the basis of the ACK/NACK feedback data specific to the fourth decoded TB 422-4 received from the active device components 211, an ACK/NACK codeword vector from the pre-configured ACK/NACK codebook.

Still in the fourth time slot 402-4, the receiver 354 of the BS 170 receives the third ACK/NACK RF signal 432-3 and decodes the third ACK/NACK RF signal 432-3. The result of decoding the third ACK/NACK RF signal 432-3 is third decoded ACK/NACK data 442-3, which is feedback indicative of whether the third decoded TB 422-3 was correctly or incorrectly decoded. While only four time slots have been illustrated in this particular example, the method may continue in similar fashion over further time slots.

For simplicity of illustration, the mirror RF signal 430 is illustrated as aligned with the first time slot 402-1. Similarly, the first ACK/NACK RF signal 432-1 is illustrated as aligned with the second time slot 402-2, the second ACK/NACK RF signal 432-2 is illustrated as aligned with the third time slot 402-3 and the third ACK/NACK RF signal 432-3 is illustrated as aligned with the fourth time slot 402-4. Collectively, the act of reflecting that has been described hereinbefore as leading to the mirror RF signal 430, the first ACK/NACK RF signal 432-1, the second ACK/NACK RF signal 432-2 and the third ACK/NACK RF signal 432-3 may be referenced as "backscatter communications." It should be clear that there may be a time offset between the temporal boundaries of the time slots 402 and the commencement of the reflecting. Indeed, the UE 110 may be instructed, by the BS 170, to wait an initial time offset, from the beginning of the respective time slot 402, before commencing reflecting. The initial time offset before commencing reflecting can be configured to be TB-specific, i.e., the timing offset for the commencement of reflecting employing an ACK/NACK codeword vector that has been selected on the basis of ACK/NACK feedback data generated from decoded TB 422-$i$ may be different than commencement of reflecting employing an ACK/NACK codeword vector that has been selected on the basis of ACK/NACK feedback data generated from TB 422-$k$. In some embodiments, the timing offset configuration of TBs can be signaled from the BS 170 to the UE 110 through higher layer signaling including RRC and MAC-CE.

The ACK/NACK feedback data may be implemented as a single decoding status indicator bit indicative of a decoding status for a corresponding decoded TB 422. The ACK/NACK feedback data may include a plurality of decoding status indicator bits, with each decoding status indicator bit in the plurality of bits indicative of a decoding status for a corresponding decoded TB 422. In some embodiments, the ACK/NACK feedback data may include a decoding status indicator bit corresponding to each code block among a plurality of code blocks included in a decoded TB 422. The ACK/NACK feedback data may include an index to a specific TB. The ACK/NACK feedback data may include an index to a specific code block index inside a TB. The ACK/NACK feedback data may include a combination of indices to specific TBs and specific code blocks. In some aspects of the present application, the ACK/NACK feedback data may include bits indicative of a decoding status for more than one TB transmitted in the past.

As discussed in view of FIG. 4, the BS 170 receives, from the UE 110, an ACK/NACK RF signal 432 for every RF signal 412 transmitted by the BS 170. It is the task of the BS 170 to decode the ACK/NACK feedback data that has been included, by the UE 110, in each ACK/NACK RF signal 432.

It has been discussed hereinbefore that the altering of a given RF signal 412 is performed on the basis of ACK/NACK feedback data, specific to the TB that is decoded from the RF signal 412, received from the active device components 211 and the pre-configured ACK/NACK codebook. More specifically, the passive device components 210 of the UE 110 select an ACK/NACK codeword vector from the pre-configured ACK/NACK codebook, based on the ACK/NACK feedback data.

At the BS 170, a baseband received signal, $y_j$, demodulated from the ACK/NACK RF signal 432 in a time slot with index j may be represented as follows:

$$y_j = h_j \alpha_j s + n_j$$

where: $h_j$ is representative of an aggregate channel vector from the BS 170 to the UE 110 and back to the BS 170; $\alpha_j$ is representative of the $j^{th}$ ACK/NACK codeword vector selected from the pre-configured ACK/NACK codebook; s is representative of the DL symbol transmitted, by the BS 170, in the TB 412; and $n_j$ is a noise vector.

Since the symbol s is representative of the DL symbol transmitted by the BS 170, the BS 170 already knows s. However, from the received signal, $y_j$, it is the task of the BS 170 to estimate both $\alpha_j$ and $h_j$. The problem of estimating both vectors from the received signal may be considered challenging.

One solution to this estimation problem begins with receipt, at the BS 170, of the mirror RF signal 430. The mirror RF signal 430 does not include an ACK/NACK codeword vector. Accordingly, the BS 170 can analyze the baseband component, $y_1$ of the mirror RF signal 430 to estimate only the aggregate channel vector, $h_1$. Rather than considering that the ACK/NACK codeword vector is absent from the received signal, it may be considered that the ACK/NACK codeword vector, $\alpha_1$, is all ones.

It is then assumed that the aggregate channel does not change much from the first time slot 402-1 to the second time slot 402-2. Accordingly, the BS 170 can simplify the analysis of the baseband component, $y_2$, of the first ACK/NACK RF signal 432-1 to estimate the ACK/NACK codeword vector, $\alpha_2$, by substituting the known aggregate channel vector, $h_1$, for the unknown aggregate channel vector, $h_2$. Once the ACK/NACK codeword vector, $\alpha_2$, has been estimated, the BS 170 may, again, perform an analysis of the baseband component, $y_2$, this time with the ACK/NACK codeword vector, $\alpha_2$, known and the result being an estimate for the unknown aggregate channel vector, $h_2$.

More generally, the BS 170 can simplify the analysis of the baseband component, $y_{j+1}$, of the $(j+1)^{th}$ ACK/NACK RF signal 432-$(j+1)$ to estimate the ACK/NACK codeword vector, $\alpha_{j+1}$, by substituting the known aggregate channel vector, $h_j$, for the unknown aggregate channel vector, $h_{j+1}$. Once the ACK/NACK codeword vector, $\alpha_{j+1}$, has been estimated, the BS 170 may, again, perform an analysis of the baseband component, $y_{j+1}$, this time with the ACK/NACK codeword vector, $\alpha_{j+1}$, known and the result being an estimate for the unknown aggregate channel vector, $h_{j+1}$.

Design of the pre-configured ACK/NACK codebook relates to a manner of mapping ACK/NACK feedback data to an ACK/NACK codeword vector. As discussed hereinbefore, the ACK/NACK codeword vector is used, by the passive device components 210 of the UE 110, to alter a given RF signal while reflecting the given RF signal.

A given ACK/NACK codeword vector, $\alpha$, may be expanded to illustrate that the ACK/NACK codeword vector, $\alpha$, includes n elements. That is, $\alpha=(\alpha_1, \alpha_2, \ldots, \alpha_n)$, where each of the elements $\alpha_1$ is a complex symbol. In step 514, the passive device components 210 reflect the second RF signal 412-2 as the first ACK/NACK RF signal 432-1 by altering the second RF signal 412-2. It may be understood that a given time slot 402 may be subdivided into n sub-slots. Then, in the context of the ACK/NACK codeword vector, a, including n ACK/NACK elements, reflecting the second RF signal 412-2 as the first ACK/NACK RF signal 432-1 may involve multiplying the second RF signal 412-2 by a respective one of the n ACK/NACK elements in each sub-slot among the n sub-slots.

The pre-configured ACK/NACK codebook, A, may be understood to include M ACK/NACK codeword vectors, $A=[\alpha_1, \alpha_2, \ldots, \alpha_M]$. The size, M, of the preconfigured ACK/NACK codebook reflects a quantity of information that may be transmitted by the UE 110 in the form of the ACK/NACK RF signal 432. The quantity, m, of ACK/NACK information bits may be considered to be related to the quantity, M, of ACK/NACK codeword vectors by the relationship $m=\log_2 M$.

In a single-UE scenario, it is assumed herein that singular ACK/NACK feedback data is transmitted in each ACK/NACK RF signal 432, i.e., each ACK/NACK RF signal 432 is considered to relate to a single received decoded TB 422. To help the receiver 354 distinguish between the mirror RF signal 430 (no ACK/NACK data) and the first ACK/NACK RF signal 432-1 (with ACK/NACK data), a constraint of $\alpha_1 \neq 1$ may be imposed on the ACK/NACK codeword vectors, meaning that the first element of all ACK/NACK codeword vectors should not be equal to 1. Also, for defining the ACK/NACK codeword vector mapping, the NACK for the $(t-1)^{th}$ decoded TB 422-$(t-l)$ may be defined, where l can be greater than 1 (unlike the conventional ACK/NACK, where only the previous decoded TB is targeted for NACK reporting). For example, we can define the following mapping:

ACK for TB(t−1)→$\alpha_1$, NACK for TB(t−1)→$\alpha_2$, NACK for TB(t−2)→$\alpha_3$, etc.

It is possible that the UE 110 sends a NACK for a previous decoded TB 422 but the BS 170 interprets the NACK as an ACK and sends a new TB 412. In this case, the UE 110 sends a NACK for TB(t−2) and, thereby, asks for retransmission of TB(t−2). Accordingly, more protection for ACK/NACK is provided due to the passive nature of these communications. In addition, the NACK may also contain a revision number for retransmission.

Another criteria for defining the codebook, $A=[\alpha_1, \ldots, \alpha_M]$, is to design the codebook in an asymmetric way in terms of error probability. Such a design criterion provides additional protection against interpreting a NACK as an ACK and, thereby, missing a packet. In other words, assuming that ACK is mapped to codeword vector $\alpha_1$, the minimum distance between codeword vector $\alpha_1$ and the rest of the codeword vectors in the codebook should be kept large to minimize the probability of $p(\alpha_1 \text{ detected}|\alpha_m \text{ transmitted})$.

One advantage of aspects of present application is that multiple UEs 110 may send ACK/NACK RF signals 432 to the BS 170 simultaneously regarding the simultaneous DL transmission to those UEs 110. Beneficially, since the BS 170 transmits scheduled transmission to multiple UEs 110, the BS 170 already knows which of the UEs 110 have potential to feedback ACK/NACK data to the BS 170. Accordingly, the problem of detecting the UE 110 at the origin of an ACK/NACK RF signal 432 is simpler than the same problem in a grant-free scenario, in which the BS 170 has no a priori information regarding which UEs 110 are active. One challenge present in the multi-UE scenario is related to defining the ACK/NACK codebooks to better decode ACK/NACK RF signals 432 received, at the BS 170, from multiple UEs 110.

According to aspects of the present application, UE-specific ACK/NACK codebooks may be defined. That is, the ACK/NACK codebook defined for the first UE 110-1 is different from the ACK/NACK codebook defined for the second UE 110-2.

In a first approach to UE-specific ACK/NACK codebook design, a base codebook is designed initially. An identifier, a "UEID," may be associated with each UE 110. To define the ACK/NACK codebook for the $j^{th}$ UE 110-$j$ some function of the UEID associated with the $j^{th}$ UE 110-$j$ may be applied to the base codebook. Example functions that may be applied to the base codebook may include a unitary transformation function and a scrambling function, inter alia.

In a second approach to UE-specific ACK/NACK codebook design, a super codebook is defined initially. The super codebook may, for example, contain at least M×N unique codeword vectors, so that each UE 110 among N UEs 110 may be assigned a codebook that is defined to include M codeword vectors selected from among the M×N unique codeword vectors.

According to aspects of the present application, the number, N, is fixed and is representative of the number of UEs 110 that have the potential to perform passive RF signal reflection with included ACK/NACK data. According to other aspects of the present application, the number, N, is representative of a number of UEs 110 currently performing passive ACK/NACK transmission in a given network.

Notably, the UE 110 carries out passive RF signal reflection with included ACK/NACK data in view of a plurality of configuration parameters. In addition to the codebook discussed hereinbefore, other configuration parameters include ACK/NACK RF signal time slot duration, complex symbol duration and number of complex symbols per time slot.

Up to this point, aspects of the present application have been described in the context of receipt, at the UE 110, of DL transmissions from the BS 170. It will be appreciated by those of skill in the art that aspects of the present application may be useful in the context of receipt, at the UE 110, of sidelink (SL) transmissions from another UE 110. Additionally, aspects of the present application may be useful in the context of receipt, at the BS 170, of uplink (UL) transmissions from the UE 110. In both alternative cases, it is understood that the UE 110 that is at the origin of either the SL transmissions or the SL transmissions is capable of full-duplex communication.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A non-transitory computer-readable storage medium having instructions stored thereon which, when executed by one or more processors, cause the one or more processors to:
receive a first radio frequency (RF) signal comprising a first transport block;
receive, included in the first transport block, an acknowledgement instruction to enable acknowledgement (ACK) reflection;
perform, responsive to the receiving the acknowledgement instruction, a mirror reflection operation using backscatter communications to reflect an unaltered version of the first RF signal;
process the first RF signal to, thereby, generate a decoded transport block, wherein a first symbol of the decoded transport block implements, at least in part, physical downlink control channel (PDCCH) signaling;
receive a second RF signal after the receiving the first RF signal; and
reflect, based on the acknowledgement instruction, the second RF signal while altering the second RF signal to, thereby, produce an altered and reflected signal, wherein the altered and reflected signal includes an indication that the first transport block was correctly decoded.

2. A communication method, the method comprising:
receiving, by an apparatus, a first radio frequency (RF) signal, the first RF signal including a first transport block;
receiving, by the apparatus and included in the first transport block, an acknowledgement instruction to enable acknowledgement (ACK) reflection;
responsive to the receiving the acknowledgement instruction, performing, by the apparatus, a mirror reflection operation using backscatter communications to reflect an unaltered version of the first RF signal;
processing, at the apparatus, the first RF signal to, thereby, generate a decoded transport block, wherein a first symbol of the decoded transport block implements, at least in part, physical downlink control channel (PDCCH) signaling;
receiving, by the apparatus, a second RF signal after the receiving the first RF signal; and
reflecting, by the apparatus and based on the acknowledgement instruction, the second RF signal while altering the second RF signal to, thereby, produce an altered and reflected signal, wherein the altered and reflected signal includes an indication that the first transport block was correctly decoded by the apparatus.

3. The method of claim 2, wherein the PDCCH signaling includes the acknowledgement instruction.

4. The method of claim 2, wherein the receiving the acknowledgement instruction comprises receiving Radio Resource Control (RRC) signaling.

5. The method of claim 2, wherein the receiving the acknowledgement instruction comprises receiving signaling that uses Media Access Control (MAC) Control Elements (CEs).

6. The method of claim 2, wherein the reflecting the second RF signal comprises enabling passive components of the apparatus.

7. The method of claim 2, further comprising generating, based on the decoded transport block, feedback data.

8. The method of claim 7, further comprising basing the indication on the feedback data.

9. A communication apparatus configured to perform the method of claim 2.

10. An apparatus comprising:
one or more processors; and
a memory storing instructions which, when executed by the one or more processors, cause the apparatus to:
receive a first radio frequency (RF) signal, the first FR RF signal including a first transport block;
receive, included in the first transport block, an acknowledgement instruction to enable acknowledgement (ACK) reflection;
perform a mirror reflection operation using backscatter communications to reflect an unaltered version of the first RF signal;
process the first RF signal to, thereby, generate decoded transport block, wherein a first symbol of the decoded transport block implements, at least in part, physical downlink control channel (PDCCH) signaling;
receive a second RF signal after the first RF signal; and
reflect, based on the acknowledgement instruction, the second RF signal while altering the second RF signal to, thereby, produce an altered and reflected signal, wherein the altered and reflected signal includes an indication that the first transport block was correctly decoded by the apparatus.

11. An apparatus comprising:
a memory storing instructions;
a plurality of active device components, including one or more processors, configured, by the instructions, to:

receive a first radio frequency (RF) signal, the first FR RF signal including a first transport block;

receive, included in the first transport block, an acknowledgement instruction to enable acknowledgement (ACK) reflection;

process the first RF signal to, thereby, generate decoded transport block, wherein a first symbol of the decoded transport block implements, at least in part, physical downlink control channel (PDCCH) signaling; and a plurality of passive device components configured to:

perform a mirror reflection operation using backscatter communications to reflect an unaltered version of the first RF signal;

receive a second RF signal after the first RF signal; and reflect, based on the acknowledgement instruction, the second RF signal while altering the second RF signal to, thereby, produce an altered and reflected signal, wherein the altered and reflected signal includes an indication that the first transport block was correctly decoded by the apparatus.

12. A communication method, the method comprising:

transmitting, to an apparatus, a first radio frequency (RF) signal, the first FR RF signal including a first transport block, wherein a first symbol of the first transport block implements, at least in part, physical downlink control channel (PDCCH) signaling;

transmitting, to the apparatus and included in the first transport block, an acknowledgement instruction to enable acknowledgement (ACK) reflection;

receiving a mirror reflection, performed using backscatter communications, of an unaltered version of the first RF signal;

transmitting, to the apparatus, a second RF signal after the first RF signal; and receiving, from the apparatus, an altered and reflected signal, wherein the altered and reflected signal is based on the second RF signal and wherein the altered and reflected signal includes an indication that the first transport block was correctly decoded by the apparatus.

13. The method of claim 12, wherein the PDCCH signaling includes the acknowledgement instruction.

14. The method of claim 12, wherein the transmitting the acknowledgement instruction comprises transmitting Radio Resource Control (RRC) signaling.

15. The method of claim 12, wherein the transmitting the acknowledgement instruction comprises transmitting signaling that uses Media Access Control (MAC) Control Elements (CEs).

16. A communication apparatus configured to perform the method of claim 12.

17. An apparatus comprising:

one or more processors; and a memory storing instructions which, when executed by the one or more processors, cause the apparatus to:

transmit a first radio frequency (RF) signal, the first RF signal including a first transport block, wherein a first symbol of the first transport block implements, at least in part, physical downlink control channel (PDCCH) signaling;

transmit, included in the first transport block, an acknowledgement instruction to enable acknowledgement (ACK) reflection;

receive a mirror reflection, performed using backscatter communications, of an unaltered version of the first RF signal;

transmit a second RF signal after the first RF signal; and receive an altered and reflected signal, wherein the altered and reflected signal is based on the second RF signal and wherein the altered and reflected signal includes an indication that the first transport block was correctly decoded.

* * * * *